Dec. 2, 1947.   P. L. CRITTENDEN   2,431,733
COMPRESSOR VALVE
Filed Nov. 27, 1943

INVENTOR
Philip L. Crittenden
BY
ATTORNEY

Patented Dec. 2, 1947

2,431,733

UNITED STATES PATENT OFFICE 2,431,733

COMPRESSOR VALVE

Philip L. Crittenden, Edgewood, Pa., assignor to The Westinghouse Air Brake Company, Wilmerding, Pa., a corporation of Pennsylvania Application November 27, 1943, Serial No. 511,950

4 Claims. (Cl. 251—145)

This invention relates to a valve mechanism for the control of the passage of fluid under pressure, and more particularly to one capable of use as an inlet valve of a fluid compressor or the like.

It is an object of the invention to provide a compressor inlet valve mechanism which is so constructed and arranged as to keep the necessary clearance volume of the compression chamber of the compressor to a minimum for the purpose of obtaining a higher volumetric efficiency, that is, the delivery of a volume of fluid more nearly equivalent to the displacement volume of the compressor.

Another object is to provide an inlet valve which is not held closed by a spring or the like but opens by the weight of the valve itself and in addition provides a variable flow capacity which increases as the demand by the compressor increases.

A further object of the invention is to provide an improved valve assemblage, suitable for the use referred to, and comprising a flat annular valve which is supported against the force of gravity in a position adjacent the flat annular valve seat of stationary valve seat member by resilient means associated with that side of the valve seat member which is exposed to the fluid inlet of the compressor, and which is arranged to seat on the opposite side of the valve seat member and to move against the opposing force of said resilient means further away from the valve seat as the fluid pressure in the inlet exceeds that in the compression chamber.

Figure 1:
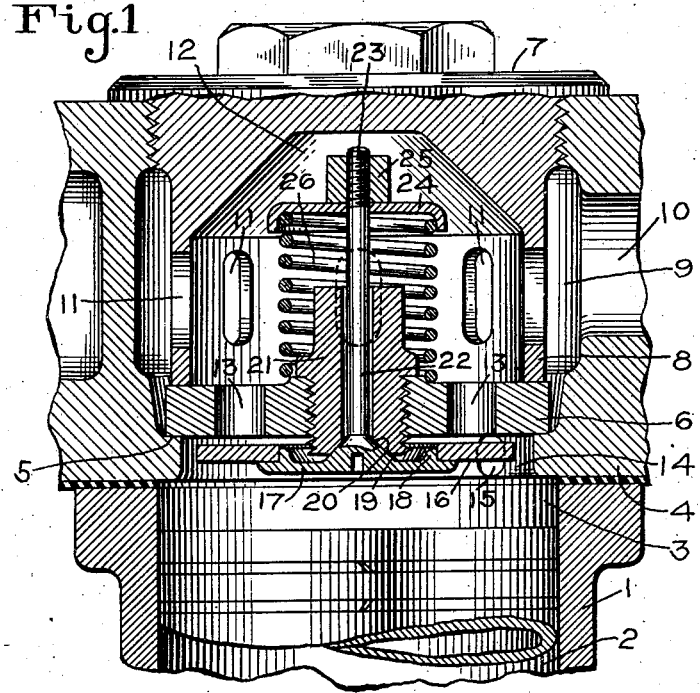
Figure 2:
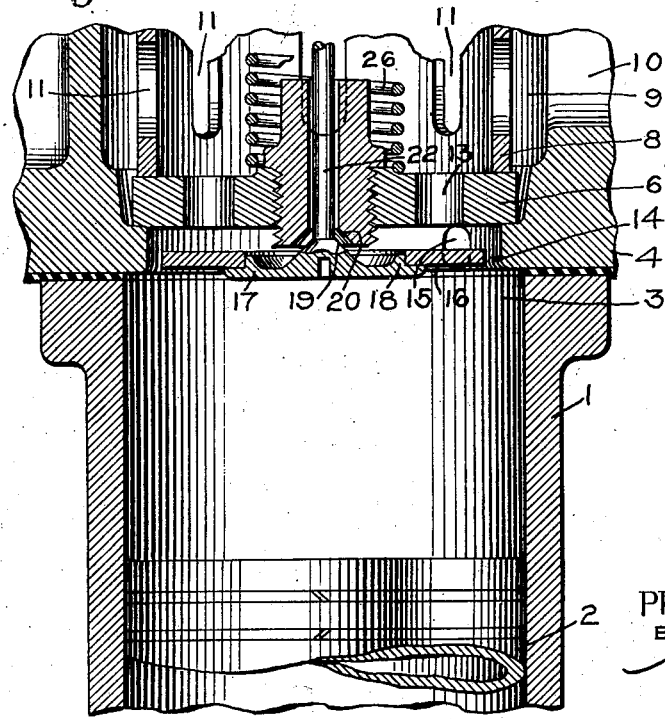

Other objects and advantages of the invention will be made apparent by the following detailed description of a preferred embodiment thereof as illustrated in the accompanying drawings, wherein: Fig. 1 is a fragmentary vertical sectional view of a compressor head assemblage embodying a preferred form of the invention, the valve mechanism being shown in one position it assumes when the piston is moving away from the top of its stroke; and Fig. 2 is a similar view of the same embodiment but illustrating the valve mechanism in a position for increased flow capacity.

In the accompanying drawing the invention is shown embodied in a fluid compressor of the type comprising a cylinder casing 1 which is provided with a bore 3. Slidably mounted to reciprocate in this bore is the usual fluid compressing piston 2.

Secured to the upper end of the cylinder casing 1 is a cylinder head 4 in which there is provided a circular opening that is open at one end to the bore 3. Located within the opening and supported a short distance above the bottom face of the head 4 by an annular lug 5 provided on the head is a valve seat member 6.

The upper end of the circular opening in the head is closed by means of a hollow nut member 7 which has screw threaded engagement with the head 4. The lower portion of this member comprises a vertically disposed annular wall 8, the lower end surface of which wall, when the member is screwed in place, engages the upper surface of the valve seat member, thereby securing the valve seat member rigidly to the annular lug 5. Above the upper face of the valve seat member 6 and below the screw-threaded connection between the nut member 7 and the head, the opening in the head is of greater diameter than that of the outer surface of the annular wall 8 of the nut member; so that the head and annular wall define a chamber 9 which is in constant open communication with a fluid inlet passage 10. This chamber is also in constant open communication, through a plurality of openings 11, with a chamber 12 which is defined by the interior surface of the hollow nut member 7 and the upper surface of the valve seat member 6.

The valve seat member is provided with a plurality of fluid inlet passages 13 through which fluid may flow from the chamber 12 to a fluid compression chamber 14 which is defined by the lower surface of the spring seat member 6, the head 4, cylinder 1, and the upper surface of the piston 2. This chamber is open to the usual fluid outlet 15 in which there is interposed the usual and well known outlet valve means, not shown.

Contained in the compression chamber 14 is an annular inlet valve 16 which is movable into and out of sealing engagement with the lower surface or valve seat of the valve seat member for opening and closing communication through the passages 13 as will hereinafter more fully appear.

The inlet valve is carried in the position in which it is shown in Fig. 1 and in all positions intermediate this position and the position in which it is shown in Fig. 2 by a valve controlling mechanism comprising a valve supporting or control member having a head portion 17 which is contained in the compression chamber 14. The upper side of this head is provided with a relatively narrow flat surface upon which the valve 16 may rest. At the inner end of this surface, radially and extending thereabove is an annular guide lug 18 which is preferably integral with the head portion and which is slidably engaged by the inner edge surface of the inlet valve 16.

The upper side of the head portion 17 is provided with a valve 19 preferably of the tapered type which is arranged for engagement with a corresponding valve seat 20 formed on the lower end portion of a vertically disposed valve seat member 21 which extends through the valve seat member 6 into the compression chamber 14 and which has screw-threaded connection with the member 6. The valve seat 20 encircles a central passage 22 in the valve seat member 21, which passage, when the valve 19 is unseated as shown in Fig. 2, is open to chambers 12 and 14.

The valve 19 tapers upwardly and inwardly and merges into an upwardly extending stem 23 which passes through the passage 22 and terminates inside of the chamber 12 at a point located a short distance above the upper end of the valve seat member 21. Contained in chamber 12 and adjustably mounted on the stem 23 is a spring seat 24 which is positioned on the stem by a nut 25 having screw-threaded connection with the upper end of the stem. Interposed between and operatively engaging the spring seat and the upper surface of the valve seat member 6 is a spring 26 which at all times exerts an upwardly directed force on the spring seat and thereby on the nut 25, stem 23 and head portion 17, the engagement of the valve 19 with its seat 20 limiting upward movement of the valve supporting and control member and also closing communication through passage 22 between chambers 12 and 14.

It should here be mentioned that the stem 23 of the valve supporting or control member is of considerably less diameter than that of the passage 22 so as to insure against binding action taking place between the stem and the valve seat member 21. It will here be noted that the guide lug 18 holds the inlet valve 16 in a centralized position on the head 17 and that as the tapered valve 21 moves upwardly toward its seated position the tapering surfaces of the valve and the valve seat 20 will cooperate, if the valve supporting or control member is slightly off center, to centralize the head and thereby the inlet valve 16 with relation to the valve seat member 6. By reason of this the inlet valve, when it reaches the position in which it is shown in Fig. 1 will be parallel with the bottom or valve seating surface of the valve seat member from which position the valve will be guided in its upward travel relative to the control member by the guide lug 18.

As shown in Fig. 1 there is a space between the upper end of the lug 18 and the valve seat member 6 but this space is less than the thickness of the inlet valve, so that when the inlet valve moves upwardly from the position in which it is shown to its seated position it will not be permitted to move out of guiding relationship with the lug 18.

It is also preferred that the flow capacity between the valve 16 and the valve seat member 6 be so restrictive that an increase in fluid pressure in the compression chamber will develop with the first upward movement of the piston.

In operation, with the piston 2 at the top of its compression stroke passage 22 will be closed by the engagement of valve 19 with the valve seat 20 as shown in Fig. 1. Valve 16 will be in sealing engagement with the seating surface of the valve seat member 6. As the piston moves downwardly, fluid will be drawn into the compression chamber 14 to supplant the piston displacement. Fluid will flow from inlet passage 10 by way of passages 11 in the annular wall 8, then through inlet passages 13 in the valve seat member 6, and past the periphery of the inlet valve 16 within the compression chamber 14.

With the piston moving at the speed for normal operation, however, the flow capacity between the valve 16 and the valve seat 6 will not be sufficient to provide an unrestricted flow of air and as a result the inlet fluid will exert a downwardly directed pressure on the upper surface of the valve 16. This pressure will be exerted on the spring 26 through the medium of the valve supporting member and spring seat 24 to compress the spring, thus permitting the valve supporting member and the valve to move downwardly to the position shown in Fig. 2 or some similar but less removed position. It is apparent that as the piston speed increases the resulting increase in the pressure of fluid acting upon the valve will cause the valve to be further depressed during each downward movement of the piston.

In the position shown in Fig. 2 or a similar position for increased flow capacity, fluid will also flow from chamber 12 through passage 22 past the valve 21 in the valve seat member 21, past the valve 19 which is now unseated, and into the compression chamber 14. It will be observed that this flow of fluid not only is added to the supply of fluid to the compression chamber but it also aids in cooling the spring, stem and other members comprising the valve controlling mechanism.

As the piston nears the end of its inlet stroke, the speed of the piston and likewise the rate of flow of fluid past the inlet valve 16 decreases. With the decreased rate of flow and consequent lessened downwardly directed fluid pressure on the valve, the spring is able to move the valves 16 and 19 upward until, at the end of the downward movement of the piston, the valve 19 will again engage the valve seat 20 and valve 16 will be in close proximity to valve seat 6 as shown in Fig. 1.

It should be understood that so long as valve 16 is out of the position in which it is shown in Fig. 1 that the downwardly directed fluid pressure acting thereon will be sufficient to keep said valve in aligned engagement with the head portion 17 and therefore protected against cocking or shifting as a result of jarring. The downwardly directed fluid pressure is equal to the spring pressure and the degree of fluid pressure acting upon the valve will be determined by the degree of spring pressure which may be adjusted by rotating the nut 25 on the stem 23.

When the piston starts its upward movement in the compression stroke, the resulting increase in the pressure of fluid in the compression chamber will cause the fluid to move the valve 16 into sealing engagement with the valve seat member 6. This valve position will be maintained throughout the upward movement of the piston.

It should be noted that the only force to be overcome in closing the valve 16 is that of gravity on the valve and after a small increase in the pressure of fluid in the compression chamber the valve will seat and remain seated during the remainder of the compression stroke of the piston.

When the piston starts its downward movement in the inlet stroke and after the pressure of fluid in chamber 12 and the compression chamber are substantially equalized, the valve 16 will drop out of engagement with the valve seat 6 and rest on the head portion 17 as illustrated in Fig. 1.

In the above it should be noted that it is not necessary to overcome any spring force to obtain the initial opening of the inlet valve during the inlet stroke of the piston.

Having now described my invention, what I claim as new and desire to secure by Letters Patent, is:

1. A valve mechanism for a fluid compressor comprising a body having a fluid inlet chamber, a fluid outlet chamber and a valve seat member having a communication through which fluid may be admitted from said inlet chamber to said fluid outlet chamber, a valve in said fluid outlet chamber cooperative with said valve seat member to open and close said communication, means for supporting said valve in a certain position from which the valve is movable relative to the valve supporting means into engagement with said valve seat member to close the communication, said means being yieldable to the pressure applied to said valve by the fluid flowing from said communication to the fluid outlet chamber to permit said valve to move from said certain position in the direction away from said valve seat member to increase the flow area of the space between the valve and said valve seat member, and resilient means mounted exteriorly of said fluid outlet chamber opposing movement of the valve supporting means and thereby said valve in the direction away from said valve seat member.

2. A valve mechanism for a fluid compressor comprising a body having a fluid inlet chamber, a fluid outlet chamber and a valve seat member having a communication through which fluid may be admitted from said inlet chamber to said fluid outlet chamber, a valve in said fluid outlet chamber cooperative with said valve seat member to open and close said communication, said valve having a certain communication open position from which it is moved into engagement with said valve seat member to close said communication and having another position to which it is moved from said certain position in response to the pressure of fluid being admitted to said fluid outlet chamber, means for supporting said valve in said certain communication open position and being yieldable to the pressure applied to said valve by fluid flowing from said communication to said fluid outlet chamber to permit said valve to move to said other position, and resilient means contained in said fluid inlet chamber and being operative in response to a decrease in the pressure of fluid flowing to said fluid outlet chamber to return said valve from said other position to said certain communication open position.

3. A valve mechanism for a fluid compressor comprising a body having a fluid inlet chamber, a fluid outlet chamber and a valve seat member having a communication through which fluid may bet admitted from said inlet chamber to said fluid outlet chamber, a valve in said fluid outlet chamber cooperative with said valve seat member to open and close said communication, said valve having a certain communication open position from which it is moved into engagement with said valve seat member to close said communication and having another position to which it is moved from said certain position in response to the pressure of fluid being admitted to said fluid outlet chamber, and resilient means for supporting said valve in said certain communication open position and being yieldable to the pressure applied to said valve by fluid flowing from said communication to said fluid outlet chamber to permit said valve to move to said other position, said resilient means being operative in response to a decrease in the pressure of fluid flowing to said fluid outlet chamber to return said valve from said other position to said certain communication open position, said resilient means comprising a movable valve supporting element and a spring contained in said outlet chamber for resiliently supporting said element away from said valve seat member.

4. A valve mechanism for a fluid compressor comprising a body having a fluid inlet chamber, a fluid outlet chamber and a valve seat member having a communication through which fluid may be admitted from said inlet chamber to said fluid outlet chamber, a valve in said fluid outlet chamber cooperative with said valve seat member to open and close said communication, means for supporting said valve in a certain position from which the valve is movable relative to the valve supporting means into engagement with said valve seat member to close the communication, a guide carried by the valve supporting means for guiding said valve as the valve moves relative to said means, said means being yieldable to the pressure applied to said valve by the fluid flowing from said communication to the fluid outlet chamber to permit said valve to move from said certain position in the direction away from said valve seat member to increase the flow area of the space between the valve and said valve seat member, and resilient means mounted exteriorly of said fluid outlet chamber opposing movement of the valve supporting means and thereby said valve in the direction away from said valve seat member.

PHILIP L. CRITTENDEN.

REFERENCES CITED

The following references are of record in the file of this patent:

UNITED STATES PATENTS

| Number | Name | Date |
| --- | --- | --- |
| 1,636,888 | Wishart | July 26, 1927 |
| 1,235,338 | Lemp | July 31, 1917 |
| 1,475,826 | Hoffman | Nov. 27, 1923 |
| 1,629,495 | Frankenberg | May 24, 1927 |
| 1,435,105 | Clapp | Nov. 7, 1922 |
| 1,611,457 | Keller | Dec. 21, 1926 |